United States Patent [19]

Morris et al.

[11] Patent Number: 4,505,731
[45] Date of Patent: Mar. 19, 1985

[54] DELIVERY DRIVE FOR GLASSWARE FORMING MACHINE

[75] Inventors: Nicholas G. Morris, Windsor; Charles M. Kingsbury, Manchester; Bruce R. Beckwith, Unionville, all of Conn.

[73] Assignee: Emhart Industries, Inc., Farmington, Conn.

[21] Appl. No.: 472,363

[22] Filed: Mar. 4, 1983

[51] Int. Cl.³ ............................................. C03B 9/44
[52] U.S. Cl. ...................................... 65/225; 65/304
[58] Field of Search ............... 65/165, 164, 207, 221, 65/225, 304, 238, 241

[56] References Cited

U.S. PATENT DOCUMENTS

| | | | |
|---|---|---|---|
| 1,350,448 | 8/1920 | Graham et al. | 65/165 |
| 2,137,734 | 11/1938 | Tipping | 65/304 |
| 2,267,236 | 12/1941 | Goodrich | 65/225 |
| 3,895,931 | 7/1975 | Hamilton | 65/207 |
| 4,339,264 | 7/1982 | Dahms | 65/241 |

Primary Examiner—William F. Smith
Assistant Examiner—Michael K. Boyer
Attorney, Agent, or Firm—Arthur B. Moore

[57] ABSTRACT

A drive system for arcuately oscillating the gob guiding units of the delivery system of a rotating table type glassware forming machine. The drive means includes a drive shaft having a crank and associated crank roller at one end, the roller being operatively situated within a crank box on one of the gob guiding units. Rotating of the drive shaft causes oscillatory motion of the gob guiding unit. A connecting link is provided to transfer this motion to other gob guiding units.

4 Claims, 6 Drawing Figures

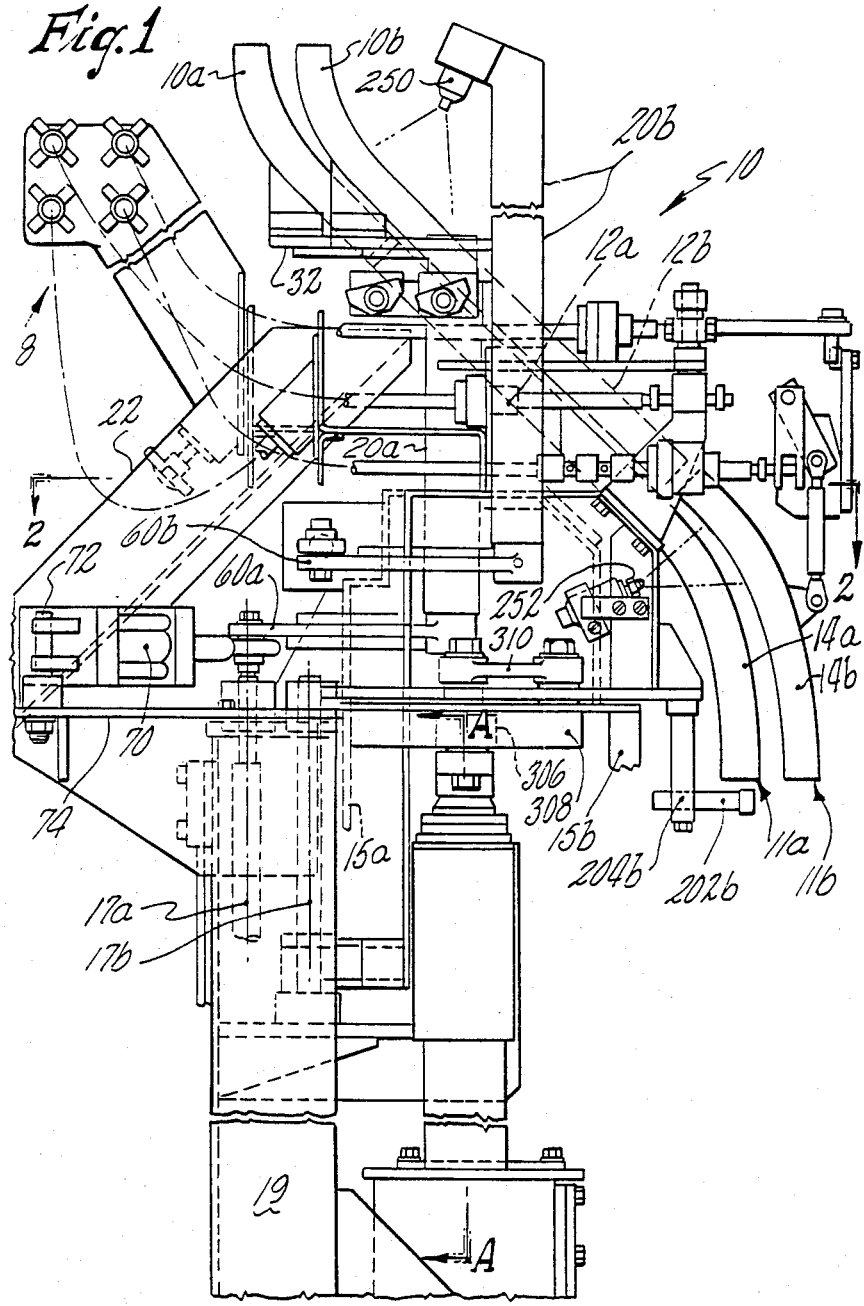

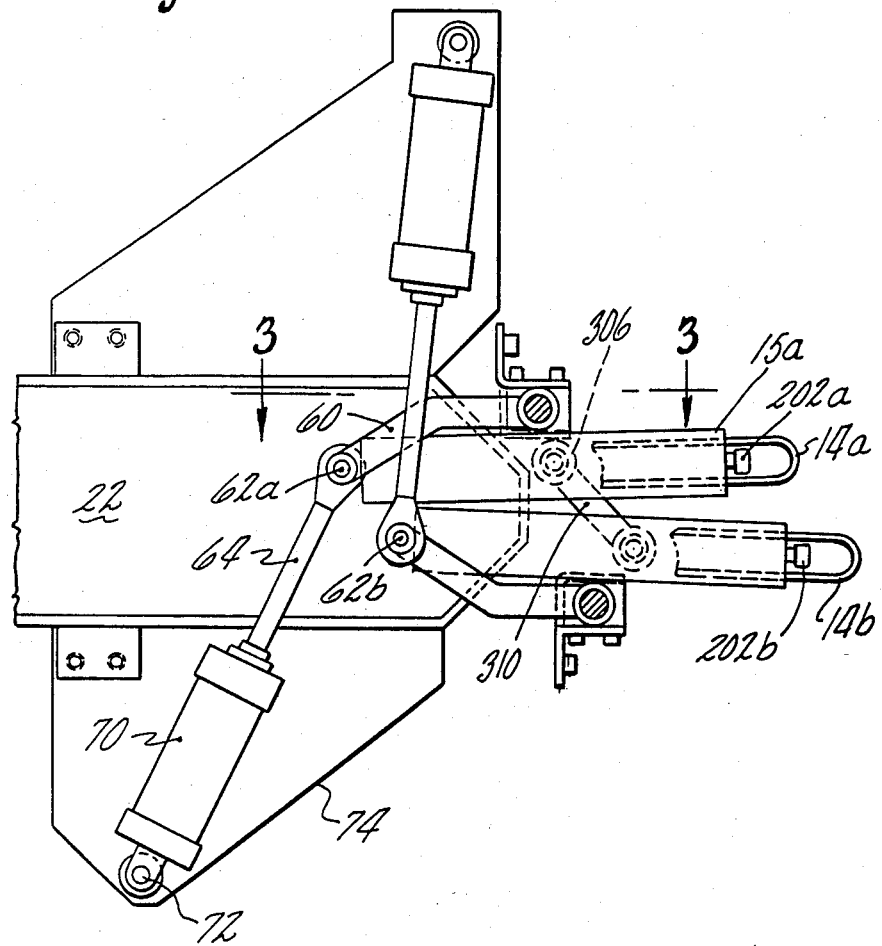

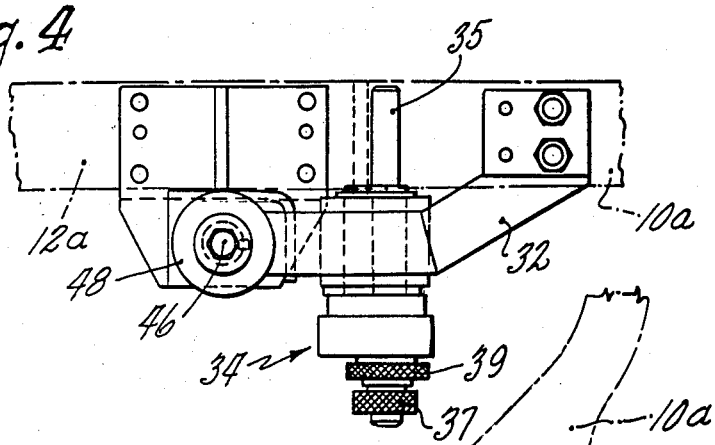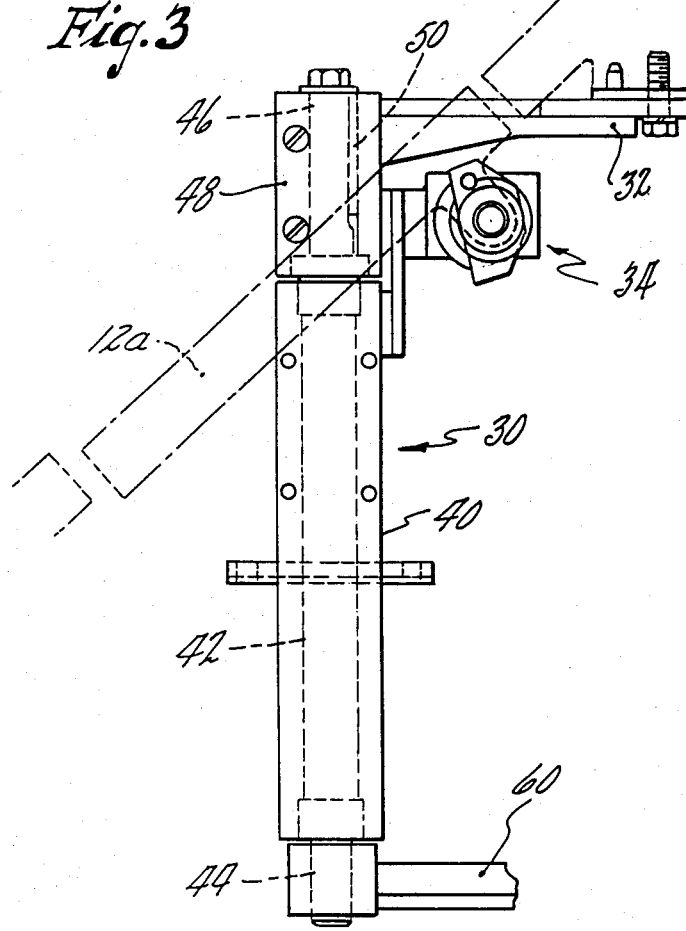

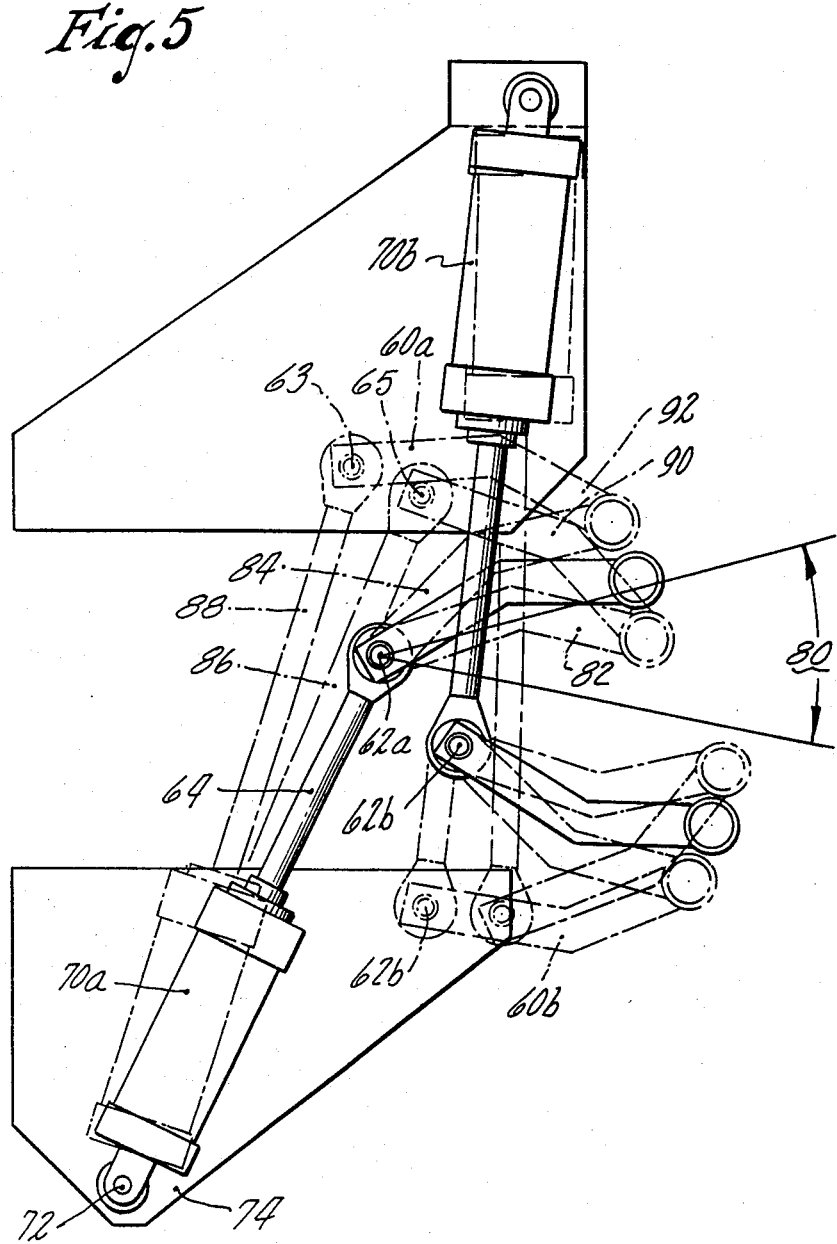

DELIVERY DRIVE FOR GLASSWARE FORMING MACHINE

BACKGROUND OF THE INVENTION

1. Field of the Invention

The invention relates generally to glassware forming machines of the rotating table type having a plurality of continuously rotating, circumferentially spaced forming units. More particularly, the invention relates to an apparatus for driving a delivery system for delivering gobs of molten glass to the continuously rotating blank molds of the machine.

2. Description of the Prior Art

Glassware forming machines of the rotating table type are well known in the glassware manufacturing industry. One type of such machine is shown in U.S. Pat. No. 1,979,211 and is commonly referred to as the "Emhart H-28 Machine." This type of machine is a single table, continuous rotary motion machine having a plurality of individual sections or forming units mounted for rotation about the axis of the machine. These machines have been available with different numbers of individual forming units, thus constituting, for example, a 6, 12 or 18 section machine. In such H-28 machines each individual forming unit produces one glassware article for each complete revolution or cycle of the machine and will therefore be referred to herein as H-28 single gob machines.

A significant improvement over the H-28 single gob machine is disclosed in U.S. Pat. No. 4,339,264 which describes an H-28 double gob machine where each individual forming unit produces two glassware articles for each complete cycle. This patent is hereby incorporated by reference in this disclosure in its entirety.

One of the unique features of the prior art H-28 double gob machine is its delivery system, that is, the manner in which it guides or delivers gobs to the continuously rotating blank molds of the machine. Each set of inner and outer blank molds has associated with it a gob guiding unit consisting of a scoop, trough and deflector for guiding gobs into the blank molds. Each gob guiding unit oscillates over a predetermined arcuate path about a delivery system axis parallel to the machine axis so that in one arcuate direction the speed of the deflector of the gob guiding unit approximates that of the continuously moving blank mold to facilitate gob delivery.

The delivery of gobs to the blank molds of a continuously rotating H-28 machine, whether single or double gob, is quite important. The gob must be delivered by the gob guiding unit while the blank molds are moving. In the H-28 single gob machine this may be accomplished by matching the arcuate speed of the gob guiding unit (in at least the direction where it moves with the blank) to that of the continuously moving blank mold. The same problem exists in H-28 double gob machines although compounded by the fact that, in addition to both gobs having to be delivered while the corresponding molds are moving, both gobs should be delivered at the same time with respect to each other.

The prior art machine was provided with a cam and cam follower mechanism for oscillating the gob guiding units along a predetermined arcuate path. This structure, regardless of the cam profile selected, caused undesireably high aceleration forces to be applied to the gob guiding units as well as the gobs sliding thereon. The prior art H-28 single gob machine used a crank and crank roller to effect this oscillatory motion. A straight bar, pivotable at one end and spring biased at the other, served as the means by which the motion of the crank roller was transferred to the gob guiding unit in the single gob machine. This mechanism was satisfactory for low speed operation of the single gob machine but proved undesireable at the high speeds of the double gob machine. Accordingly, it is an object of this invention to provide a crank drive arrangement for causing the oscillatory motion of the gob guiding units. It is another object of this invention to provide a crank arrangement for driving the gob guiding units with lower acceleration than prior art devices.

SUMMARY OF THE INVENTION

These and other objects of this invention are achieved by the preferred embodiment which comprises an improvement in a glassware forming machine of the rotating table type having at least two gob guiding units for periodically delivering a gob of glass to a corresponding blank mold rotating continuously on said machine. Each gob guiding unit includes a scoop, a trough, and a deflector. The improvement comprises:

a drive shaft having a crank and crank roller secured to the end thereof;

a crank box secured to one of said gob guiding units, said crank box for receiving said crank roller;

a connecting link pivotably secured to each of said gob guiding units for transferring the motion of said one of said gob guiding units to the other.

BRIEF DESCRIPTION OF THE DRAWINGS

FIG. 1 is a partially cut away diagrammatic left side elevational view of a delivery system constructed in accordance with the principles of the invention;

FIG. 2 is a diagrammatic plan view of a portion of FIG. 1 taken along the lines 2—2 with certain portions removed for clarity;

FIG. 3 is a side elevational view of a scoop pivot assembly taken along the lines 3—3 in FIG. 2;

FIG. 4 is a plan view of FIG. 3;

FIG. 5 is a diagrammatic view of a portion of FIG. 2 showing the positions of various members at various points in the delivery cycle;

DESCRIPTION OF THE PREFERRED EMBODIMENT

Figure 6:
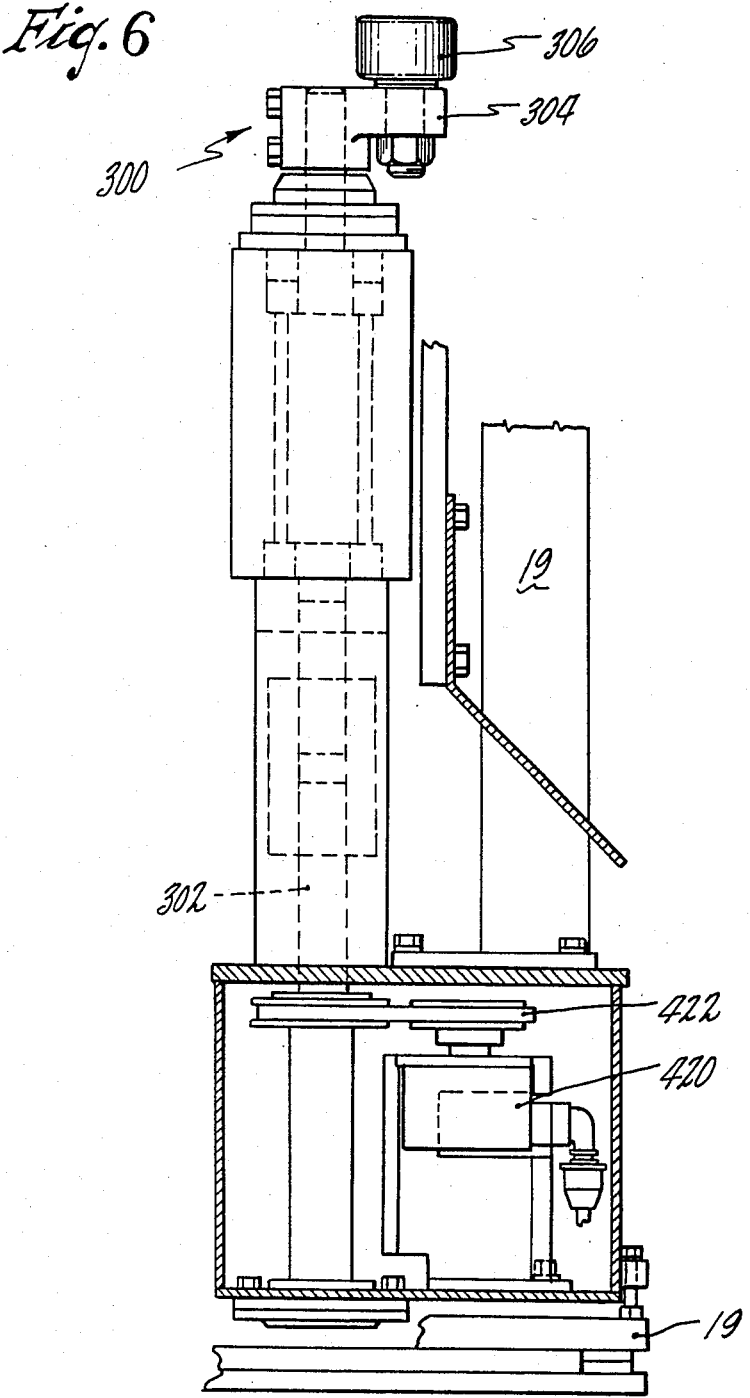
FIG. 6 is a cross sectional view of a portion of FIG. 1 taken the lines A—A.

Referring now to FIG. 1 there is shown a side elevational view of delivery system 10 which includes a pair of gob guiding units 11a and 11b, one associated with each feeder orifice (not shown). Each gob guiding unit includes a scoop 10, trough 12 and deflector 14. While the feeder orifices and shears are not shown it will be understood that the scoop of each gob guiding unit is situated under a feeder orifice to receive gobs as they are cut by the shears. The "a" series of components constitute the delivery components for the outer molds of the machine and the "b" components relate to the inner molds, the terms "inner" and "outer" indicating the relative radial positions of the blank molds with respect to the machine axis. While the preferred embodiment of the invention is described with reference to a double gob machine, it will be understood that the invention may be adapted for use with machines having more than two molds per forming unit.

FIG. 1 also shows a side elevational view of a deflector adjustment system 8 which is more particularly described in co-pending application, Ser. No. 472,391, filed Mar. 4, 1983 assigned to the assignee of the present invention.

Each gob guiding unit 11a and 11b includes a deflector and trough support frame 15a and 15b, respectively, and scoop support and pivot assemblies 20a and 20b, respectively. Each frame 15a and 15b is pivotally attached to main frame 19 to pivot about axes 17a and 17b respectively. For clarity, frame 15a is shown in phantom.

As in the prior art H-28 double gob machine disclosed in U.S. Pat. No. 4,339,264, each gob guiding unit oscillates about its respective pivot axis in order to move the deflectors along a path which approximately corresponds to a portion of the path of the continuously rotating blank molds. There are preferred times when the paths of the deflectors and blank molds overlap during which a gob can be delivered. As will be explained below, however, this invention constitutes an improvement over the prior art delivery system.

SCOOP PIVOT ASSEMBLY

One of the disadvantages of the prior art delivery system was its inability to move the scoops sufficiently out of the way to facilitate streaming with or without the orifice and to provide enough clearance for an easy orifice ring change. While the scoop was sufficiently pivotable about a horizontal axis to effect the gob reject function (clearing the gob to permit it to fall into a cullet chute), the clearance was inadequate for an orifice ring change. The present structure (the subject of a co-pending application assigned to the assignee of the present invention) overcomes this disadvantage by providing scoop pivot assemblies 20a and 20b for pivoting each scoop out of the way about a vertical axis. This interrupts the feeding of selected gobs to the blank molds and permits the glass from the corresponding feeder orifice to fall directly into cullet chute 22. This pivoting motion of each scoop pivot assembly permits selective gob reject, as will be explained below, and also facilitates orifice ring change. The structure also permits a wider cullet chute than possible with the prior art design.

Scoop pivot assemblies 20a and 20b will be more clearly understood by reference to FIGS. 2, 3, 4 and 5. Since the operations of each scoop pivot assembly 20a and 20b are very similar, the description herein will refer primarily to scoop pivot assembly 20a.

FIG. 2 shows a diagrammatic plan view of a portion of FIG. 1 and includes some elements merely outlined to show their relative positions and others omitted for clarity.

As shown in FIG. 3, scoop 10a is supported in position beneath its corresponding feeder orifice (not shown) by pivot assembly 20 having a lateral support arm 32 (note that hereafter the "a" and "b" designations will generally not be used unless necessary to distinguish features of the inner and outer delivery means). Trough 12 is supported on trough support assembly 34 and is pivotable about shaft 35. It should be noted that FIG. 3 is an elevational view of FIG. 2 along the lines 3—3 although many components shown in FIG. 3 are omitted from FIG. 2 for clarity.

Trough support 34 has a pair of knurled controls 37 and 39 for adjusting shaft 35 to horizontally align the upper end of trough 12 with scoop 10. Trough support 34 also has a detented knob which is rotated to vertically align the upper end of trough 12 with scoop 10.

Pivot assembly 20 comprises a fixed outer portion 40 secured to frame 15 of its corresponding gob guiding unit (by means not shown) and an inner rotatable shaft 42 having a lower end 44 and an upper end 46. Lateral support arm 32 is secured to an upper housing 48 which is keyed at 50 to upper shaft end 46 and, as best seen in FIG. 4, has a dog leg shape in order to accommodate trough 12 and align it with scoop 10.

The lower shaft end 44 is secured to a similarly dog leg shaped link 60, best seen in FIG. 2, the other end of which is pivotably secured about axis 62 to rod 64 of piston and cylinder assembly 70. Cylinder 70 is pivotably secured at axis 72 to frame member 74 which is secured to main frame 10. Cylinder 70 is a conventional air cylinder assembly the piston of which is connected to rod 64 which is shown in its fully retracted position in FIG. 2.

Referring now to FIG. 5, air cylinders 70a and 70b are shown in fully retracted positions in solid lines and in fully extended positions in phantom. Dog links 60a and 60b are shown in positions corresponding to the retracted and extended positions of rods 64 and pivot shafts 42 are shown in positions corresponding to the oscillatory motion of frames 15a and 15b.

By reference to FIGS. 2 and 3 it will be understood that link 60 and arm 32 are essentially parallel (although, as best seen in FIG. 1, at different levels relative to their respective pivot assembly) and extension of rod 64 will cause lateral support arm 32 to pivot about the axis of shaft 42, thus moving corresponding scoop 10 from underneath its corresponding orifice, permitting streaming or gob rejection into cullet chute 22. Note that each axis 62a and 62b is aligned with its respective feeder orifice and pivot axes 17a and 17b, respectively, when the pistons are fully retracted. Cylinder 70 is actuated by gob reject means (not shown) in order to cause the corresponding scoop to move from a delivery position to a gob reject position. These positions of the scoop may be equated to the positions of dog link 60 shown in FIGS. 2 and 5. The delivery position of a scoop is that in which it is under its orifice and the reject position is that in which it is swung away.

Referring now to FIG. 5 the delivery and reject positions of cylinders 70a and 70b and associated components are shown superimposed upon the oscillating motion of frames 15a and 15b. It is understood that frame 15a normally oscillates along arc 80 and frame 15b similarly oscillates but along a slightly shorter arcuate path (not shown). When there is no gob reject signal, cylinder 70 will keep rod 64 in its retracted position causing dog link 60 to oscillate between positions 82 and 84. This motion keeps the scoop aligned with its orifice at all times even though frame 15 is oscillating. When a gob reject signal activates cylinder 70 the arcuately oscillating motion of dog link 60 and corresponding arm 32 is superimposed upon the motion of extended rod 64 causing it to oscillate between positions 86 and 88 as frame 15 oscillates through its normal path, thus causing the end of rod 64 to oscillate between points 63 and 65 as shown. This oscillatory motion of dog link 60 (and corresponding lateral support arm 32) between positions 90 and 92 does not affect the gob reject function since at both extremes of this oscillatory motion the scoop is removed from beneath its corresponding orifice.

GOB GUIDING UNIT OSCILLATING MEANS

The prior art H-28 double gob machines utilized a cam and cam follower for oscillating the gob guiding unit. The present invention has replaced this cam driven mechanism with a crank and crank follower mechanism in order to enable an increase in machine speed without adversely affecting performance. It should be noted that prior art H-28 single gob machines utilized a crank and a crank follower biased by a spring. This structure is incapable of providing sufficient positive action at high machine speeds which are possible by the present invention.

Referring now to FIG. 6 there is shown a cross sectional elevational view taken along the lines A—A of FIG. 1. Crank assembly 300 provides the driving means for oscillating both frames 15a and 15b about their respective axes 17a and 17b. Crank assembly 300 is driven by an output drive shaft which is rotated by means similar to those described in the aforementioned U.S. Pat. No. 4,339,264 and accordingly the details are not discussed herein. Crank assembly 300 includes a crank 304 secured to the top end of shaft 302 and a crank roller 306.

Referring to FIGS. 1, 2 and 6, crank roller 306 is positioned within crank box 308 which is secured to the bottom of frame 15a. Link 310 is pivotably secured to both frames 15a and 15b to transfer the oscillatory crank motion to frame 15b. Link 310 is positioned on the frames in such a way that the arcuate path of deflector 14b (associated with the inner blank mold) is smaller than that of deflector 14a. The radius of the crank is predetermined such that it produces a maximum velocity of the outer deflector slightly above the corresponding outer blank mold velocity. Likewise, the link length and position were also chosen to produce a maximum velocity of the inner deflector slightly above the inner blank mold velocity.

Those skilled in the art will understand that numerous modifications and improvements to the preferred embodiment of the invention disclosed herein may be made without departing from the spirit and scope thereof.

What is claimed is:

1. An improved glassware forming machine of the rotating table type which includes a plurality of blank molds continuously rotated around a central axis; at least two gob guiding units each for periodically delivering a gob of glass to one of said blank molds, each of said gob guiding units comprising a scoop, a trough, and a deflector; and a drive assembly for oscillating each of the gob guiding units over a path overlapping the path of one of the blank molds; wherein the improvement comprises an improved drive assembly, comprising:

a drive shaft having a crank and associated crank roller directly secured to the end thereof;

a crank box secured to one of said gob guiding units, said crank box housing said crank roller; and a connecting link pivotably secured to at least one of said gob guiding units for, upon rotation of said drive shaft, transferring the motion of said one of gob guiding units to the other.

2. Apparatus as defined in claim 1 wherein each of the gob guiding units is associated with a corresponding blank mold.

3. Apparatus according to claim 1 wherein the point of attachment of said connecting link to said one of said gob guiding units is aligned with the axis of said crank roller.

4. An improved glassware forming machine of the rotating table type which includes a plurality of blank molds continuously rotated around a central axis; at least two gob guiding units each for periodically delivering a gob of glass to one of said blank molds, each of said gob guiding units comprising a scoop, a trough, and a deflector; and a drive assembly for oscillating each of the gob guiding units over a path overlapping the path of one of the blank molds; wherein the improvement comprises an improved drive assembly, comprising:

a drive shaft having a crank and associated crank roller directly secured to the end thereof;

a crank box secured to one of said gob guiding units, said crank box housing said crank roller; and a connecting link one end of which is pivotally connected to one of said gob guiding units at a point along the axis of said crank roller, and the other end of which is pivotally connected to the other of said gob guiding units whereby the other of said gob guiding units is driven by said connecting link.

* * * * *

UNITED STATES PATENT AND TRADEMARK OFFICE
CERTIFICATE OF CORRECTION

PATENT NO.  : 4,505,731
DATED       : March 19, 1985
INVENTOR(S) : Nicholas G. Morris et al.

It is certified that error appears in the above-identified patent and that said Letters Patent is hereby corrected as shown below:

Col. 4, line 16 - "10" should read -- 19 --.

Signed and Sealed this

Sixteenth Day of July 1985

[SEAL]

Attest:

DONALD J. QUIGG

Attesting Officer     Acting Commissioner of Patents and Trademarks